United States Patent [19]

Stine et al.

[11] 4,096,346
[45] Jun. 20, 1978

[54] WIRE AND CABLE

[75] Inventors: Clifford R. Stine, Solon; William J. Herbert, Mantua; Bruce E. Klipec, Aurora, all of Ohio

[73] Assignee: Samuel Moore and Company, Mantua, Ohio

[21] Appl. No.: 543,797

[22] Filed: Jan. 24, 1975

Related U.S. Application Data

[63] Continuation-in-part of Ser. No. 328,366, Jan. 31, 1973, Pat. No. 3,911,202, and Ser. No. 498,716, Aug. 19, 1974, abandoned.

[51] Int. Cl.² .......................... H01B 3/28; H01B 9/06
[52] U.S. Cl. .............................. 174/36; 174/110 PM; 174/110 AR; 174/120 AR; 174/120 SR
[58] Field of Search ................. 174/110 PM, 110 AR, 174/110 SR, 110 R, 120 AR, 120 SR, 121 SR, 121 AR, 102 R, 105 R, 105 B, 115, 113 R, 36; 204/159.11, 159.2; 264/22; 117/93.3, 218

[56] References Cited

U.S. PATENT DOCUMENTS

| 2,471,752 | 5/1949 | Ingmanson | 174/120 AR UX |
| 3,032,604 | 5/1962 | Timmons | 174/115 |
| 3,084,114 | 4/1963 | Gilbert et al. | 174/110 PM UX |
| 3,260,694 | 7/1966 | Wang | 174/110 PM UX |
| 3,602,636 | 8/1971 | Evans | 174/115 |
| 3,725,230 | 4/1973 | Bahder et al. | 174/110 PM X |
| 3,735,025 | 5/1973 | Ling et al. | 174/110 PM X |
| 3,823,255 | 7/1974 | Gase et al. | 174/121 AR X |

FOREIGN PATENT DOCUMENTS

| 940,269 | 10/1963 | United Kingdom | 174/110 PM |

OTHER PUBLICATIONS

Insulation/Circuits, Directory/Encyclopedia, Jun./Jul. 1972, pp. 116–117, 122–128.

*Primary Examiner*—Arthur T. Grimley
*Attorney, Agent, or Firm*—Clelle W. Upchurch

[57] ABSTRACT

An electrical conductor insulated with a cured heat resistant, radiation resistant, substantially dimensionally stable electrical insulation comprising a chlorinated polyethylene elastomer composition which has been electron cured with a dosage of at least 1 megarad. The product of the invention may be a single insulated wire or a group of twisted or cabled insulated wires enclosed in an electron cured chlorinated polyethylene elastomer composition jacket.

9 Claims, 7 Drawing Figures

WIRE AND CABLE

This application is a continuation-in-part of our applications Ser. No. 328,366 filed Jan. 31, 1973, now U.S. Patent No. 3,911,202 issued Oct. 7, 1975, and Ser. No. 498,716 filed Aug. 19, 1974 now abandoned, the disclosures of which are incorporated herein by reference.

This invention relates generally to insulated electrical conductors and more particularly to electrical insulation for electrical conductors and to a method for insulating an electrical conductor therewith.

In our Application Ser. No. 328,366, we disclose an electrical conductor having non-thermoplastic synthetic electrical insulation obtained by extruding or otherwise coating an electrical conductor with a thermoplastic elastomer and curing the elastomer by irradiation with electrons. Elastomeric compositions including halosulfonated polyethylene, a poly(ethylene-propylene diene) polymer such as poly(ethylene-propylene-hexadiene) polymer, poly(ethylene-propylene-dicyclopentadiene) polymer, poly(ethylene-propylene-ethylidene-norbornene) polymer and poly(ethylene-propylene-methylene-norbornene) polymer are disclosed for insulating an electrical conductor.

Prior to our invention described in our earlier application, it had been proposed to use polyethylene cross-linked by irradiation as electrical insulation on cables. For example, Skala, in a publication by Western Electric Co. entitled "Method of Irradiating Objects" dated January, 1966 and Bahder et al. in U.S. Pat. No. 3,725,230 issued Apr. 3, 1973 disclose cables having polyethylene insulation cross-linked by irradiation. Polyethylene tape cross-linked by irradiation is disclosed for insulating electrical conductors in an article entitled "Irradiated Polyethylene" in Modern Plastics, pages 100, 101 and 219 for April, 1974. Rosata in an article entitled "Electrical Wire and Cable Plastics Coating-What's Ahead!" published in *Wire and Wire Products* for March, 1970 discloses polyethylene and polyvinyl chloride insulated cables and Blodgett et al. in an article entitled "Insulations and Jackets for Cross-Linked Polyethylene Cables" published in *AIEE Transactions on Power* in December, 1963 discloses cross-linked polyethylene insulated cables. The conductors provided with irradiation cured polyethylene insulation have the disadvantage that the insulation has a relatively low crystalline melting point and poor flame resistance.

In our application Ser. No. 498,716 we disclose an electrical cable having electrical conductors insulated with irradiation cured ethylene-tetrafluoroethylene copolymer, ethylene-chlorotrifluoroethylene copolymer or polyvinyl chloride, and a protective jacket of irradiation cured halosulfonated polyethylene polymer, a polychloroprene or a chlorinated polyethylene enclosing the insulated conductors.

It is an object of this invention to provide electrical conductors having improved insulation cross-linked by irradiation with electrons. Another object of the invention is to provide an electrical conductor insulated with a non-thermoplastic elastomeric material having improved flame retardancy. Still another object of the invention is to provide electrical conductors having novel insulation of improved dimensional stability when exposed to an increase in temperature. A still further object of the invention is to provide a cable having an extruded non-thermoplastic jacket enclosing insulated electrical conductors.

Other objects will become apparent from the following description with reference to the accompanying drawing wherein FIG. 1 illustrates in side elevation one embodiment of an insulated single conductor provided by the invention;

The foregoing objects and others are accomplished in accordance with this invention, generally speaking, by providing an electrical conductor electrically insulated with a substantially non-thermoplastic chlorinated polyethylene polymer composition which has been cured by irradiation with electrons. The product of the invention may be a single conductor with an electrically insulating layer of substantially non-thermoplastic elastomer composition cured by irradiation with electrons disposed thereabout or it may be a cable of a plurality of individually insulated electrical conductors enclosed in a common electron cured chlorinated polyethylene polymer jacket. The term "non-thermoplastic elastomer composition" is used herein to identify a polymer which is less crystalline at room temperature than polyethylene.

Figure 1:
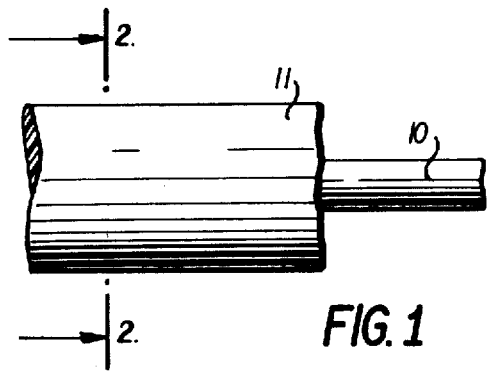
Figure 2:
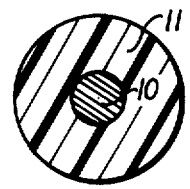
FIG. 2 illustrates in cross-section the embodiment of FIG. 1 taken along the line 2—2.

Referring now to FIGS. 1 and 2 of the drawing, a conductor is illustrated having a single 18 ga. tinned copper wire 10 enclosed in a layer 11 about 20 mils thick of a cured substantially non-thermoplastic chlorinated polyethylene polymer composition. The electrical conductor may be insulated by extruding a layer 11 of a thermoplastic chlorinated polyethylene polymer composition about wire 10 and subsequently curing the chlorinated polyethylene polymer by exposing it to electrons having a kinetic energy of about 500,000 electron volts from an electron accelerator until the exposure provides a dosage of about 12 megarads.

Figure 3:
FIG. 3 illustrates in cross-section another embodiment of an insulated single conductor.

A second embodiment of a single conductor provided by the invention is illustrated in FIG. 3. The conductor is a standard 16 ga. tinned copper wire 10 enclosed in a substantially non-thermoplastic inner layer 11a of ethylene-propylene-ethylidene-norbornene elastomer composition and an outer layer 11 of substantially non-thermoplastic chlorinated polyethylene elastomer composition. The two layers 11a and 11 may be simultaneously co-axially extruded or may be co-axially extruded successively. The layers may be electron cured separately or together during extrusion or after extrusion by passing the insulated conductor through an electron generator.

Figure 4:
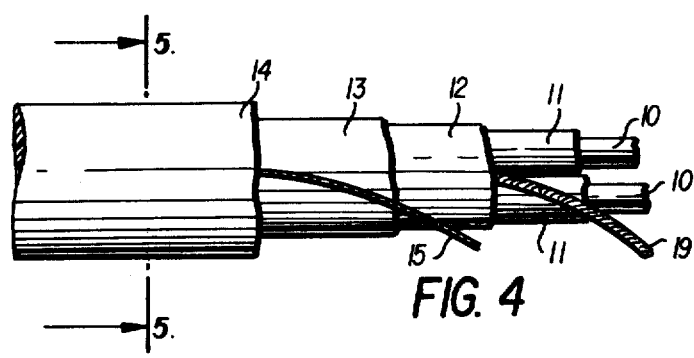
FIG. 4 illustrates in side elevation an embodiment of an electrical cable provided by the invention.
Figure 5:
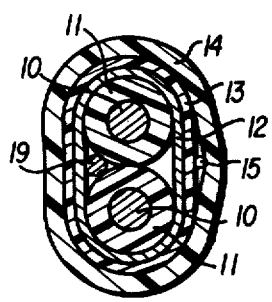
FIG. 5 is a cross-section taken along the line 5—5 of FIG. 4.

Turning now to FIGS. 4 and 5, a cable having two conductors similar to the conductor of FIG. 1 and an electron cured chlorinated polyethylene elastomer insulating layer 11 about a tinned copper wire 10 is wrapped in a composite tape having a first aluminum layer 12 next to insulating layers 11 and a second poly(ethylene terephthalate) polyester layer 13 bonded to layer 12.

Layers 12 and 13 may be an Aluminum-Mylar laminated tape about 0.85 mils thick, a commercial product available from various tape manufacturers having a layer of a poly(ethylene terephthalate) polyester available as "Mylar" from E. I. duPont de Nemours & Co. of Wilmington, Delaware. A dimensionally stable jacket 14 of an electron cured substantially non-thermoplastic chlorinated polyethylene elastomer composition is disposed in contact with and about layer 13. The layer 11 and jacket 14 may be electron cured together or the layer 11 may be cured separately before jacket 14 is extruded or otherwise applied over the composite tape of layers 12 and 13. The electron curing may be effected as described with reference to the embodiment of FIGS. 1 and 2. A rip cord 15 may be placed between layers 13 and 14 for stripping a portion of jacket 14 from about the conductors to assist in exposing insulated wires 10 for terminating or splicing. A drain wire 19 is placed in contact with layer 12.

Figure 6:
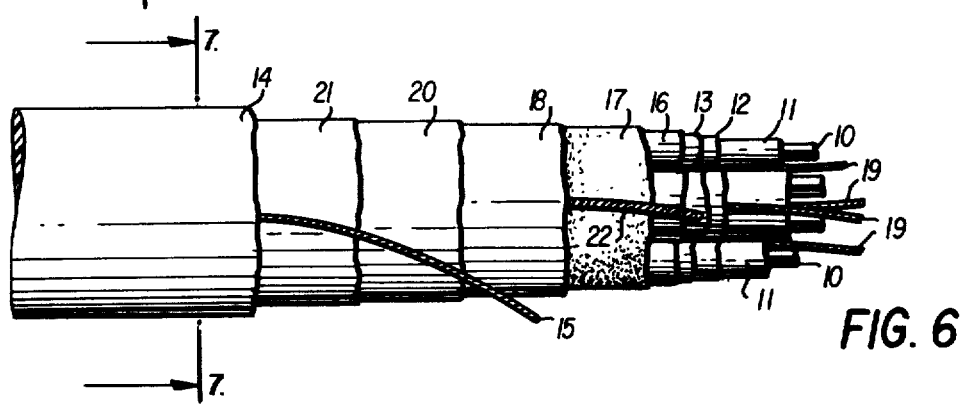
FIG. 6 is a side elevation of another embodiment of a cable provided by the invention.
Figure 7:
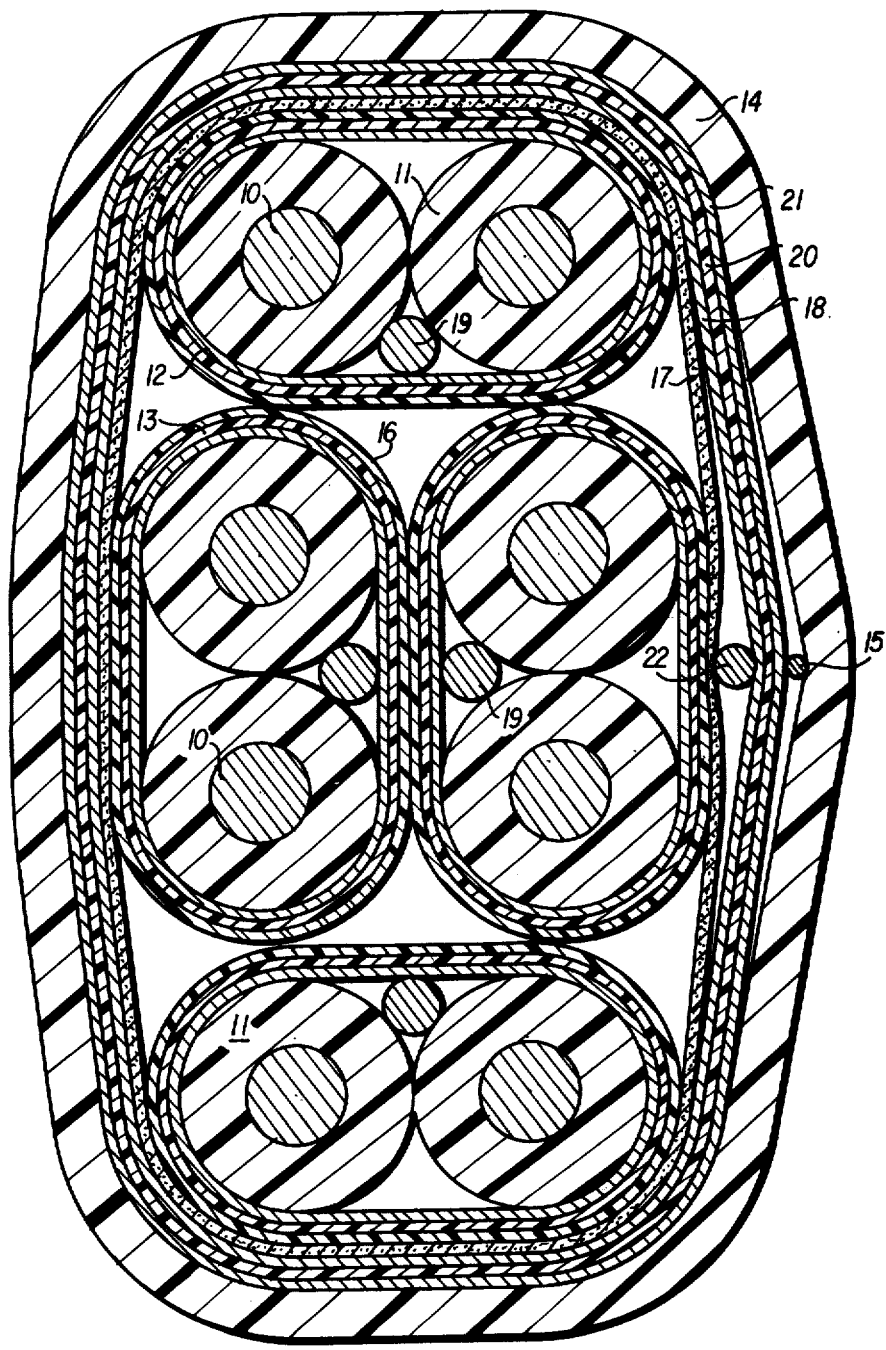
FIG. 7 is a cross-section taken along the line 7—7 of FIG. 6.

A second embodiment of a cable is illustrated in FIGS. 6 and 7. This cable has four pairs of the conductors of FIGS. 1 and 2 having an electrical wire 10 and an electrically insulating layer 11 of chlorinated polyethylene elastomer composition which has been cross-linked by irradiation with a dosage of electrons as described with reference to FIGS. 1 and 2. Each pair of conductors and a drain wire 19 are enclosed in an Aluminum-Mylar tape having layers 12 and 13 similar to those of the embodiment of FIGS. 4 and 5. A film 16 of poly(ethylene terephthalate) about 1.5 mils thick such as "Mylar" tape is helically wound about layers 12 and 13 and drain wire 19.

The four pairs of conductors are bundled together with a first layer 17 about 5 mils thick of a fiberglass fabric impregnated with a silicone rubber. A spirally wrapped Aluminum-Mylar-aluminum tape is disposed about layer 17 to form second aluminum layer 18, third poly(ethylene terephthalate) layer 20 and fourth aluminum layer 21. A chlorinated polyethylene elastomer composition is extruded over layer 21 to form a jacket 14 about 60 mils thick. The chlorinated polyethylene elastomer of layers 11 and 14 is cured by exposure to a source of electrons as described herein above with reference to FIGS. 1 and 2. An uninsulated 18 ga. stranded tinned copper drain wire 22 is helically wound throughout the length of the cable between layers 17 and 18 to protect the conductors from electrostatic noise. A rip cord 15 is placed between layers 14 and 21.

While a cable having a preferred structure is illustrated in FIGS. 6 and 7, this structure may be modified to provide cables particularly advantageous for specific utilities. For example, in some embodiments a "Mylar" layer alone may be substituted for the laminated tape having layers 12 and 13 enclosing a pair of insulated conductors. Also, a fire barrier layer of fiberglass fabric impregnated with a silicone rubber may be placed about the tape 12, 13. In some examples, a fire barrier layer of asbestos or fiberglass-silicone rubber might be placed between jacket 14 and the Aluminum-Mylar-aluminum tape 20, 21, 18. The cable may have more than one fire barrier layer 17. In other words, various combinations of the layers may be used. A copper layer may be substituted for aluminum in the tapes.

Insulated conductors 10 may be disposed side by side or twisted together. The preferred lay for twisted conductors is from about 1½ inches to 4 inches. Twisting of the wires rejects magnetic noise. If the cable is to be used in instrumentation, the conductors are preferably 22 ga. to 14 ga. while conductors in control wire may be from 18 ga. to 2 ga. Two or more of the cables illustrated in FIG. 3 may be twisted together at, for example, a lay of from 3 inches to 20 inches to form a larger cable. The drain wires 19 are preferably twisted about the pairs of conductors at a lay of from about 1½ inches to about 4 inches to avoid bumps on the cable but they can be disposed along an axis parallel to the axis of the cable.

As shown in FIG. 5, one embodiment of the cable of the invention comprises a plurality of pairs of insulated electrical conductors and an uninsulated drain wire enclosed in a layer of aluminum or copper, a first layer of poly(alkylene terephthalate) polyester adhered to the aluminum or copper, a separate layer of poly(alkylene terephthalate) polyester disposed about the first poly(alkylene terephthalate) polyester layer, a layer of fiberglass impregnated with a silicone resin disposed about all pairs of conductors, a layer of aluminum over the impregnated layer, a layer of poly(alkylene terephthalate) polyester bonded to the aluminum layer, a second aluminum layer bonded to the polyester and a jacket about the second layer.

The wire and cable provided by the invention is useful in connecting instrumentation in chemical plants and other processing plants and is particularly advantageous where a conductor must have insulation which is dimensionally stable at high temperatures. The process of the invention has the advantage that a thermoplastic resin, a chlorinated polyethylene elastomer composition is extruded about a wire and is then converted into a non-thermoplastic cross-linked product without the introduction of undesirable externally activated chemical agents to the composition.

In practicing the process of the invention an extrudeable, electron curable composition containing a chlorinated polyethylene elastomer is extruded about a suitable electrically conductive wire such as, for example, a copper wire, an iron wire, a stainless steel wire, a nickel alloy wire, a tinned copper wire or the like. This conductor may be a single strand or a plurality of strands gathered together. The insulated wire thus obtained may be passed directly through apparatus provided with an electron accelerator, such as for example, a Van de Graff electron generator. The insulation on the conductor should be exposed to a dosage of at least 1 megarad. Exposure times which provide a dosage of up to about 20 megarads is usually sufficient. If the electron generating equipment is not available or if for some other reason it is desired to postpone curing of the insulation, the insulated wire may be wound about a spool or otherwise adapted for storage and exposed later to the necessary dosage of electrons. The exposure can be done by passing the wire through a field of electrons generated by the generator. Preferably, the electrons should have a kinetic energy of at least about 300,000 electron volts. A convenient way of curing the insulation is to unwind the insulated wire from one spool on one side of the field of electrons and rewind it on a second spool after it has passed through the electron field. As stated above, the wire can either be separately cured as just described or a plurality of wires can be assembled in a cable structure of the type disclosed herein and then the entire cable exposed to the necessary dosage to provide for curing of both the primary insulation on the wire and the jacket of the cable.

In addition to providing a cable wherein both the jacket and the primary insulation on the conductors are cured compositions containing a chlorinated polyethylene elastomer, the invention broadly contemplates cables having an electron cured chlorinated polyethylene elastomer jacket enclosing conductors which are electrically insulated with any suitable cured non-thermoplastic product prepared by the electron curing of any suitable thermoplastic elastomer. For example, the conductors may be provided with an insulation containing any of the non-thermoplastic products cured with electrons disclosed in our earlier Application Ser. No. 328,366. The insulation on the wire may be, for example, a halosulfonated polyethylene, a poly(ethylene-propylene-diene) polymer such as poly(ethylene-propylene-hexadiene) polymer, poly(ethylene-propylene-dicyclopentadiene) polymer, poly(ethylene-propylene-methylene-norbornene) polymer or poly(ethylene-propylene-ethylidene-norbornene) polymer.

In order to provide the necessary dimensional stability and green strength for handling the wire or cable prior to curing, it is preferred to include in the compositions disclosed in our earlier application from about 50 to about 250 parts of a filler per 100 parts of the thermoplastic elastomer and from about 20 to about 250 parts filler per 100 parts chlorinated polyethylene elastomer. The cured insulation on the conductor should preferably have a hardness of at least about Shore A 50 and a tensile strength at 100% elongation of at least about 400 p.s.i. Suitable fillers for reinforcing the thermoplastic elastomers disclosed in our earlier application and for reinforcing the chlorinated polyethylene used either for the insulation directly on the wire or for making the jacket of the cable are disclosed in the earlier application and include, for example, calcined clay, litharge, carbon black, hydrated alumina, antimony trioxide, hydrated aluminum silicate and the like.

The preferred poly(ethylene-propylene-diene) (EPDM) composition is poly(ethylene-propylene-ethylidene-norbornene) polymer. The EPDM polymer may contain in mol percent from 2 to 10% diene and 25 to 50 mol percent ethylene and the remainder propylene. Suitable commercial resins have been identified in our earlier application.

It may be desirable to include an antioxidant material in the elastomer composition to be cured. Usually from about 0.5 part per 100 parts of base elastomer to about 2.5 part per 100 parts of base polymer is sufficient. A preferred antioxidant material is Agerite Resin D sold by the R. T. Vanderbilt Company. A thermostabilizing material may also be included in the composition prior to extrusion such as, for example, litharge. Preferably, the halosulfonated polyethylene is chlorosulfonated polyethylene. "Hypalon" is a commercial product available from E. I. duPont de Nemours & Co. which may be used as the chlorosulfonated polyethylene polymer. The hardness and tensile modulus of the chlorosulfonated polyethylene elastomer are improved by including one of the reinforcing filler materials listed hereinbefore. Other modifiers such as lubricants and sensitizers may be included in the composition to facilitate the extruding of the elastomer or to facilitate curing.

As stated hereinbefore, any of the fillers and other additives disclosed in our earlier application can also be used in compounding the chlorinated polyethylene used for insulating the wire or for making the jacket for the cable. The amount and type of each of the additives included in the composition will vary depending upon the characteristics required of the insulation. Typical formulations and the physical properties of electron cured elastomer compositions which are suitable for use as insulation 11 and for jacket 14 are given in the following Table I:

TABLE NO. 1

|  | 1 | 2 | 3 | 4 | 5 | 6 |
|---|---|---|---|---|---|---|
| CPE, Cm 0136 | 100 | | | | | |
| CPE, 2243.50 | | 100 | | | | |
| CPE, 2243.49 | | | 100 | | | |
| CPE, 2243.52 | | | | 100 | 100 | 100 |
| N-550 Black | 5 | 5 | 5 | 5 | 5 | 5 |
| Litharge, TLD-90 | 5 | 5 | 5 | 5 | 5 | 5 |
| Drapex 6.8 | 7 | 7 | 7 | 7 | 7 | 7 |
| Hydral 710 | 30 | 30 | 30 | 30 | 30 | 30 |
| $Sb_2O_3$ | 5 | 8 | 8 | 8 | 8 | 8 |
| Paraffin Wax | 3 | 3 | 3 | 3 | 3 | 3 |
| Sundex 790 | 10 | 10 | 10 | 10 | 10 | 10 |
| Chemlink 30 LS | 7 | 7 | 7 | 7 | | |
| Agerite Resin D | 1 | .75 | .75 | .75 | .75 | .75 |
| HVA-2 | | | | | 4 | |
| TAPA | | | | | | 4 |
| Properties at 15 MRAD: | | | | | | |
| Tensile Strength, PSI | 3010 | 2610 | 2410 | 2070 | 2090 | 2030 |
| 200% Modulus, PSI | 520 | 1240 | 1210 | 970 | 680 | 570 |
| % Elongation | 520 | 350 | 390 | 440 | 480 | 610 |
| % Heat Distortion | 11 | 8 | 12 | 9 | 7 | 17 |
| Gravimetric Moisture Absorption, $Mg/In^2$ | 79 | 31 | 28 | 33 | 29 | 36 |
| Air Aging, 7 days at 150° C | | | | | | |
| % Retained Tensile | 63 | 76 | 90 | 93 | — | — |
| % Retained Elongation | 68 | 22 | 10 | 46 | — | — |
| Shore A Hardness, instantaneous/10 s | | 88/81 | 92/82 | 90/81 | 85/77 | 82/71 |
| Tensile Set, % | 18 | 34 | 35 | 39 | 29 | 24 |
| Vertical Strip Flammability | | | | | | |
| Avg Burn Time | >100s | >100s | 49s | 75 | 55 | 33 |
| Max Burn Time | >100s | >100s | 58s | >100s | >100s | 45 |

In the above Table "CPE" is an abbreviation for chlorinated polyethylene. The CPE used in the experiments listed in the Table was a commercially available product of Dow Chemical Co. "N-550" is a carbon black filler. "Drapex" is an epoxidized soybean oil and may be purchased as a stabilizer for polymers from Argus Chemical Company. "Hydral" is a hydrated alumina filler available from Aluminum Company of America. "Sundex" is an aromatic petroleum oil available from Sun Oil Company for use as a plasticizer. "Agerite Resin" is an antioxidant available from R. T. Vanderbilt. "HVA-2" is m-phenylene dimaleimide available from E. I. duPont de Nemours and Company and is a radiation sensitizer.

From information presently available, it appears that a chlorinated polyethylene having a low sodium content is best for making insulation in jackets where moisture proofing is desirable. The chlorinated polyethylene may contain any percent chlorine but best results have been obtained so far with chlorinated polyethylenes containing from 36% to 42% by weight chlorine. The sodium content should preferably be less than 25 parts per million.

Although the invention is described in detail for the purpose of illustration it is to be understood that such detail is solely for that purpose and that variations can be made therein by those skilled in the art without departing from the spirit and scope of the invention except as it may be limited by the claims.

While the various layers 12, 13, 16 and 17 are illustrated as a loop, in actual practice the layers are tapes wrapped about the enclosed components with overlapping edges. For the sake of clarity, the overlapping edges of the layers is not shown in the drawing.

We claim:

1. An electrically insulated conductor comprising an electrical conductor, an inner electrically-insulating layer disposed about the electrical conductor comprising an electron-cured elastomeric composition selected from the group consisting of halosulfonated polyethylene, poly(ethylene-propylene-hexadiene)polymer, poly(ethylene-propylene-dicyclopentadiene)polymer, poly(ethylene-propylene-ethylidene-norbornene)polymer and poly(ethylene-propylene-methylene-norbornene)polymer, and an outer layer of electron-cured chlorinated polyethylene composition disposed about the said inner layer.

2. The conductor of claim 1 wherein the conductor is a single strand or multiple strands twisted together.

3. The electrical conductor of claim 1 wherein the compositions of the inner and outer electrically-insulating layers contain a filler.

4. An electrical cable comprising at least two insulated electrical conductors and an outer protective jacket enclosing all of the conductors wherein at least one of the conductors has an inner electrically-insulating layer disposed thereabout comprising an electron-cured elastomeric composition selected from the group consisting of halosulfonated polyethylene, poly(ethylene-propylene-hexadiene)polymer, poly(ethylene-propylene-dicyclopentadiene)polymer, poly(ethylene-propylene-ethylidene-norbornene)polymer and poly(ethylene-propylene-methylene-norbornene)polymer, and an outer layer of electron-cured chlorinated polyethylene composition disposed about the said inner layer.

5. The electrical cable of claim 4 wherein the outer protective jacket is an electron-cured chlorinated polyethylene composition.

6. The electrical cable of claim 4 having a first layer of aluminum or copper disposed in encompassing relationship about the conductors intermediate the conductors and the outer protective jacket, a second layer of poly(alkylene-terephthalate) polyester disposed between the said first layer and the jacket, and an uninsulated drain wire disposed between the conductors and the said first layer.

7. The electrical cable of claim 6 wherein a sheet comprising a fiberglass matrix impregnated with a synthetic rubber is disposed intermediate the said second layer and the outer protective jacket.

8. The electrical cable of claim 4 comprising a plurality of pairs of insulated electrical conductors, layer of aluminum or copper disposed about at least one of the pairs of insulated conductors, an uninsulated drain wire disposed between the aluminum or copper layer and the insulated conductors, a layer of poly(alkylene-terephthalate)polyester adhered to the outer surface of the aluminum or copper layer, a separate layer of poly(alkylene-terephthalate)polyester disposed in encompassing relationship about the said adhered polyester layer, a first layer of fiberglass impregnated with a synthetic rubber disposed about all of the conductor pairs, a second layer of aluminum or copper disposed about the said first fiberglass layer, a third layer of poly(alkylene-terephthalate)polyester disposed in encompassing relationship about the said second layer, a fourth layer of aluminum or copper disposed between the said third layer and the outer protective jacket, and an uninsulated drain wire disposed between the said first and second layers.

9. A cable comprising a plurality of pairs of electrical conductors insulated with the non-thermoplastic product of the electron curing of a thermoplastic elastomer and an uninsulated drain wire enclosed in a layer of aluminum or copper, a first layer of poly(alkylene terephthalate) polyester adhered to the aluminum or copper, a separate layer of poly(alkylene terephthalate) polyester disposed about the first poly(alkylene terephthalate) polyester layer, a layer of fiberglass impregnated with a silicone resin disposed about all pairs of conductors, a layer of aluminum over the impregnated layer, a layer of poly(alkylene terephthalate) polyester bonded to the aluminum layer, a second aluminum layer bonded to the polyester and a jacket enclosing the said conductors, drain wire and said layers which is the non-thermoplastic product of the electron curing of a chlorinated polyethylene elastomer composition.

* * * * *